(12) United States Patent
Harita et al.

(10) Patent No.: US 6,465,920 B2
(45) Date of Patent: Oct. 15, 2002

(54) POWER SUPPLY TERMINAL-HOUSING MOTOR

(75) Inventors: Yasuhiro Harita, Kosai; Toshihiro Sato, Toyohashi, both of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/767,750

(22) Filed: Jan. 24, 2001

(65) Prior Publication Data

US 2001/0013728 A1 Aug. 16, 2001

(30) Foreign Application Priority Data

Feb. 10, 2000 (JP) ........................................ 2000-033427
Nov. 7, 2000 (JP) ........................................ 2000-339108

(51) Int. Cl.⁷ ............................................. H02K 13/00
(52) U.S. Cl. ........................ 310/71; 310/239; 310/249
(58) Field of Search ................................ 310/239, 244, 310/242, 238, 241, 71, 249

(56) References Cited

U.S. PATENT DOCUMENTS

| | | | | |
|---|---|---|---|---|
| 4,774,430 A | * | 9/1988 | Rodriguez et al. | 310/239 |
| 5,015,896 A | * | 5/1991 | Wong | 310/239 |
| 5,138,212 A | * | 8/1992 | Wong et al. | 310/239 |
| 5,196,750 A | * | 3/1993 | Strobl | 310/239 |
| 5,216,305 A | * | 6/1993 | Strobl | 310/71 |
| 5,343,102 A | * | 8/1994 | Mabuchi et al. | 310/40 MM |
| 5,563,462 A | * | 10/1996 | Strobl et al. | 310/51 |
| 5,633,542 A | * | 5/1997 | Yuhi et al. | 310/40 MM |
| 5,780,952 A | * | 7/1998 | Lau | 310/239 |
| 6,160,329 A | * | 12/2000 | Ng | 310/40 MM |
| 6,294,850 B1 | * | 9/2001 | Yui et al. | 29/597 |

FOREIGN PATENT DOCUMENTS

JP      2000-209818      7/2000

\* cited by examiner

*Primary Examiner*—Burton S. Mullins
(74) *Attorney, Agent, or Firm*—Law Offices of David G. Posz

(57) ABSTRACT

In a motor, an end plate has a pair of internal terminal-holding pedestals and an internal terminal-sandwiching slits. A pedestal-engaging portion is formed on the internal terminal-holding pedestal. An internal power-supply terminal has a holding portion, a concave portion, two insertion strips, and a brush-holding projection. Two holding through-holes are formed in the holding portion. A stopper concave portion is formed on a bottom of the internal terminal-holding pedestal. An inclined convex portion is formed on each of a pair of insertion strips of the internal power-supply terminal.

16 Claims, 5 Drawing Sheets

POWER SUPPLY TERMINAL-HOUSING MOTOR

CROSS REFERENCE TO RELATED APPLICATION

This application is based on and incorporates herein by reference Japanese Patent Applications No. 2000-33427 filed Feb. 10, 2000 and No. 2000-339108 filed Nov. 7, 2000.

BACKGROUND OF THE INVENTION

The present invention relates to a power supply terminal-housing motor.

JP 2000-209818A published on Jul. 28, 2000 proposes a power supply terminal-housing motor. In this motor, a leaf spring substrate (internal power-supply terminal) has a base portion, a female terminal extending upward from one end of the base portion, and a flat-plate portion to be connected to a leaf spring member extending from the other end of the base portion and having a brush. The base portion is inserted into a fixing convex portion of the holding portion composing a cover member and fixed to the upper surface of the holding portion.

However, because the base portion disposed at the lower end of the leaf spring substrate (internal power-supply terminal) is inserted into the fixing convex portion, there is a possibility that the leaf spring substrate may fall down in fixing the leaf spring substrate-mounted cover member to the motor. If the leaf spring substrate falls down in fixing the leaf spring substrate-mounted cover member to the motor, the leaf spring substrate damages internal parts of the motor such as a commutator.

Further, because the base portion for fixing the leaf spring substrate is provided between the female terminal and the flat-plate portion in the leaf spring substrate, a gap is generated between the female terminal and the flat-plate portion. Thus, the internal power-supply terminal causes the construction of the motor having the internal power-supply terminal to be larger in its diameter in particular than a motor whose output is equal to that of the motor having the internal power-supply terminal. The gap causes the motor diameter (construction) to be large. Thus, it is necessary to miniaturize the motor.

SUMMARY OF THE INVENTION

It is an object of the present invention to provide a power supply terminal-housing motor allowing an internal power-supply terminal to be mounted and held in the interior of a motor reliably and without the internal power-supply terminal falling down.

It is another object of the present invention to provide a compact power supply terminal-housing motor.

According to one aspect of the present invention, each of a pair of the internal power-supply terminals has a terminal portion to be connected to a power supply terminal inserted from an external terminal insertion hole to supply an electric power from outside. It also has a connection portion to be connected to a brush-holding plate. Each of a pair of the internal power-supply terminals is held by an internal terminal-holding pedestal.

According to another aspect of the present invention, a brush-holding plate and a connection portion of an internal power-supply terminal are held by an internal terminal-holding pedestal such that the brush-holding plates and the connection portion are disposed radially one above the other.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
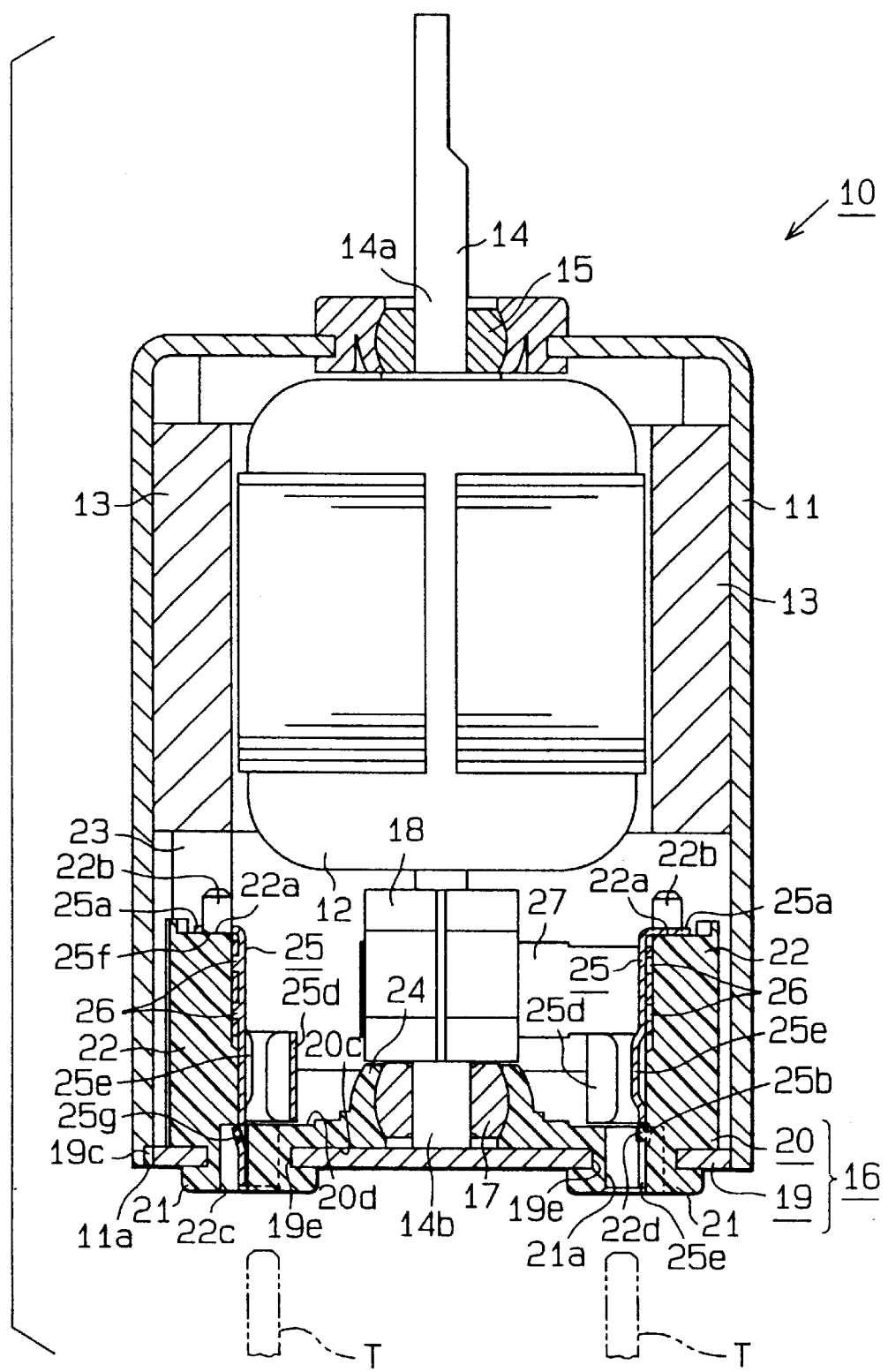
FIG. 1 is a sectional view showing a power supply terminal-housing motor of an embodiment of the present invention.

Referring first to FIG. 1, a yoke 11 of a motor 10 serving as a power supply terminal-housing motor of the embodiment is formed as a bottomed flat cylinder accommodating an armature 12. On the inner peripheral surface of the yoke 11, there are provided two field magnets 13 in opposition to each other sandwiching the armature 12 therebetween. Four engaging concave portions 11a are formed in an opening of the yoke 11, though only one engaging concave portion 11a is shown in FIG. 1.

The armature 12 has a rotary shaft 14 extending vertically from its upper and lower ends along its axis. As shown in FIG. 1, in the rotary shaft 14, one end 14a thereof extending upward is rotatably supported by a bearing 15 provided at the bottom of the yoke 11, whereas the other end 14b thereof extending downward is rotatably supported by a bearing 17 provided on a cover member 16 closing the opening of the yoke 11. A commutator 18 is mounted on the other end 14b of the rotary shaft 14.

Figure 2:
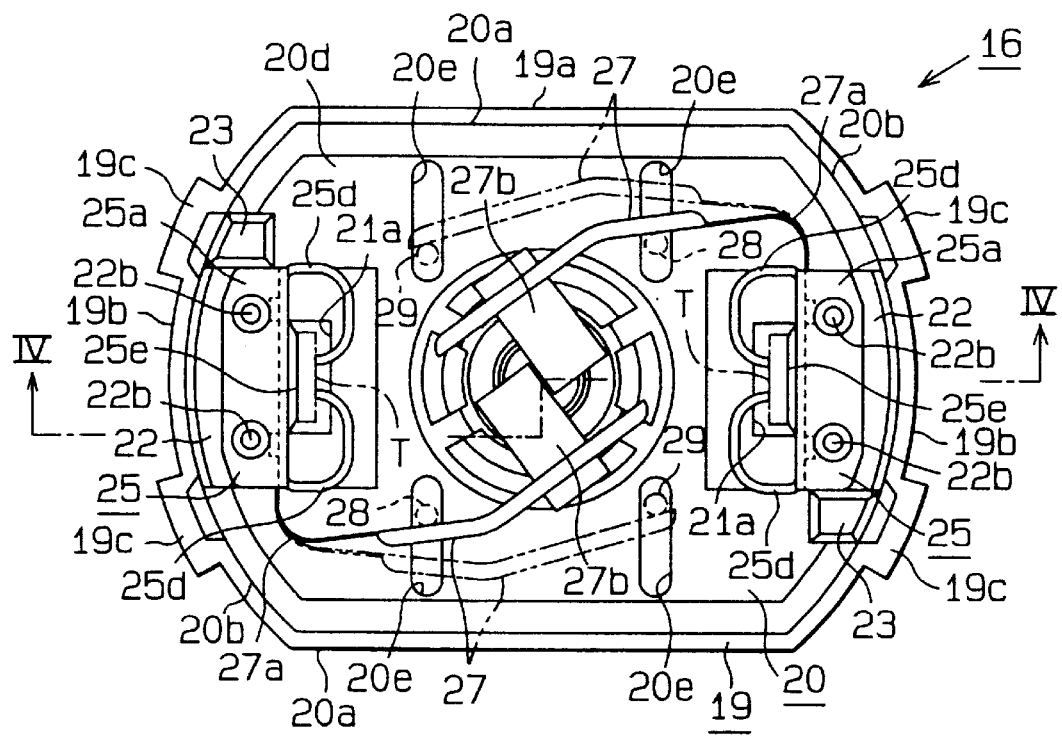
FIG. 2 is a plan view showing a cover member of the power supply terminal-housing motor.
Figure 3:
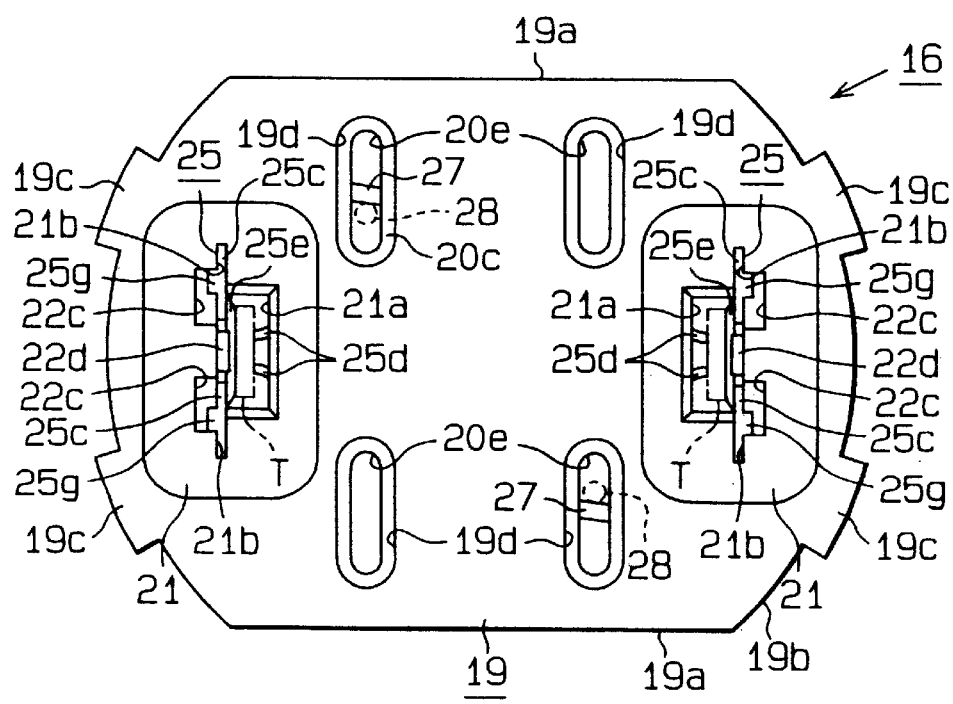
FIG. 3 is a bottom view showing the cover member of the power supply terminal-housing motor.

As shown in FIG. 1, the cover member 16 has a conductive plate 19 and an end plate 20 formed integrally with the conductive plate 19. The conductive plate 19 is made of a metal plate (for example, iron plate). As shown in FIGS. 2 and 3, the conductive plate 19 includes a pair of parallel portions 19a and a pair of circular-arc portions 19b. Two engaging convex portions 19c which engage the engaging concave portions 11a of the yoke 11 are formed on each of a pair of the circular-arc portions 19b.

Figure 4:
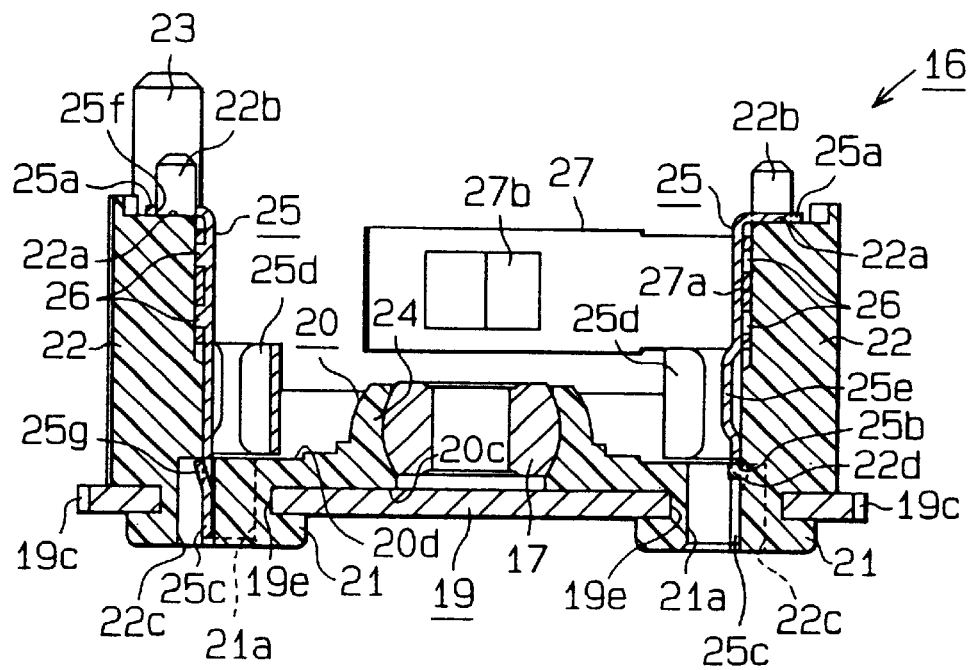
FIG. 4 is a sectional view showing the cover member of the power supply terminal-housing motor, the view being taken along a line IV—IV in FIG. 2.

As shown in FIG. 3, four through-holes 19d extending in a direction orthogonal to the parallel portion 19a are formed at central positions of the conductive plate 19. As shown in FIGS. 1 and 4, a connector through-hole 19e is formed in the neighborhood of each circular-arc portion 19b.

The end plate 20 is made synthetic resin and has a pair of parallel portions 20a and a pair of circular-arc portions 20b, as shown in FIG. 2. That is, the plane outer configuration of the end plate 20 is generally the same as that of the conductive plate 19. As shown in FIGS. 1 and 4, in the vicinity of the circular-arc portion 20b, a pair of connector portions 21 is projected downward from a rear surface 20c of the end plate 20. The end plate 20 is formed by molding a material such that while a pair of the connector portions 21 is being penetrated into the connector through-hole 19e of the conductive plate 19, the conductive plate 19 is fixed to the rear surface 20c of the end plate 20. That is, by the formation of the connector portion 21, the end plate 20 is formed integrally with the conductive plate 19 by insert molding or the like. The connector portion 21 is provided with an external terminal insertion hole 21a (shown in FIGS. 1–4) and an internal terminal-sandwiching slit 21b (shown in FIG. 3).

As shown in FIG. 2, in the vicinity of each of a pair of the circular-arc portions 20b, an internal terminal-holding pedestal 22 extending upward is provided on an upper surface 20d of the end plate 20. As shown in FIGS. 1, 2 and 4, a pair of pedestal-engaging portions 22b is projectingly formed on an upper surface 22a of the internal terminal-holding pedestal 22. The front end of the pedestal-engaging portion 22b is formed as a tapered projected portion. A stopper concave portion 22c communicating with the internal terminal-sandwiching slit 21b (shown in FIG. 3) is formed on the bottom of the internal terminal-holding pedestal 22, as shown in FIGS. 1, 3 and 4. As shown in FIGS. 1, 3 and 4, an internal terminal-supporting central concave portion 22d is formed between both stopper concave portions 22c formed on the bottom of the internal terminal-holding pedestal 22. Further, as shown in FIGS. 1, 3 and 4, a movement prevention portion 23 for preventing an axial movement of the field magnet 13 is upwardly formed on a side surface of the internal terminal-holding pedestal 22.

As shown in FIG. 1, a bearing-holding projection 24 is formed at the central position of the end plate 20. The bearing 17 is held by the bearing-holding projection 24. As shown in FIGS. 2 and 3, in correspondence with the through-holes 19d formed on the conductive plate 19, four through-holes 20e extending in a direction orthogonal to the parallel portion 20a of the end plate 20 are formed in the vicinity of the bearing-holding projection 24.

Figure 5:
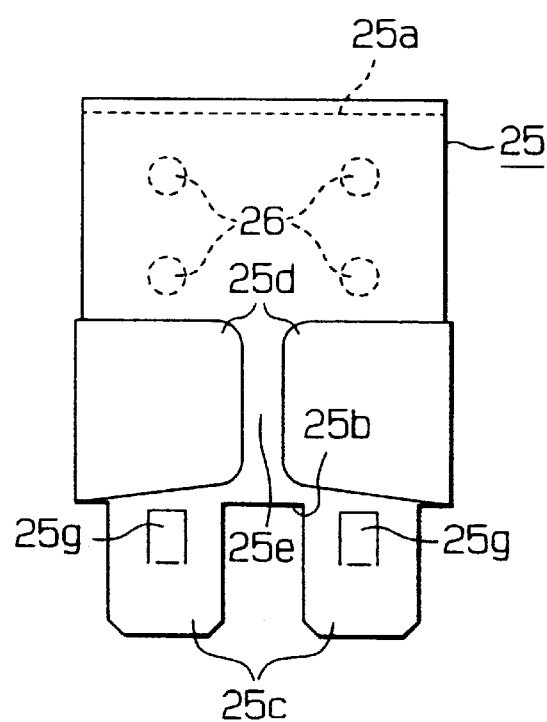
FIG. 5 is a front view showing an internal power-supply terminal of the power supply terminal-housing motor.
Figure 6:
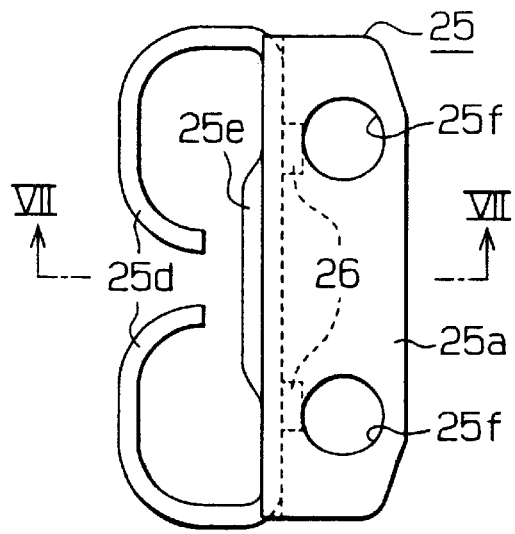
FIG. 6 is a plan view showing the internal power-supply terminal.
Figure 7:
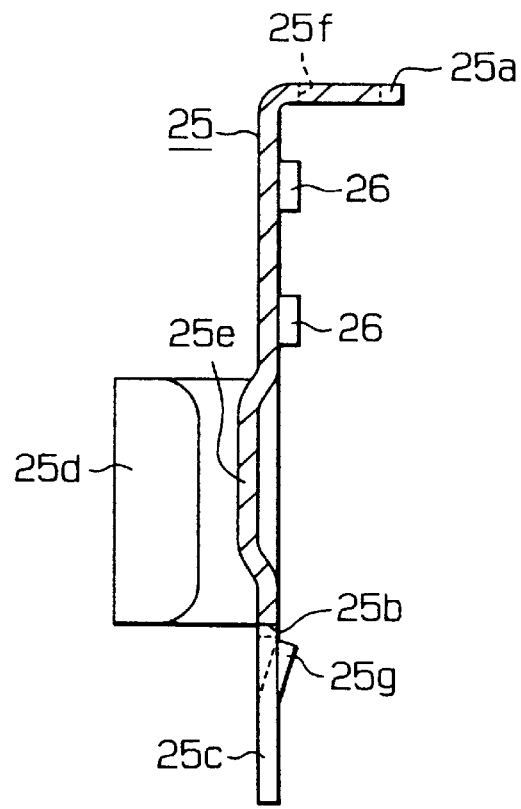
FIG. 7 is a sectional view showing the internal power-supply terminal, the view being taken along a line VII—VII in FIG. 6.

An internal power-supply terminal 25 is held on the internal terminal-holding pedestal 22. As shown in FIGS. 5 through 7, the internal power-supply terminal 25 is formed from a press-molded thin metal plate. A holding portion 25a is formed on the upper end of the internal power-supply terminal 25 by bending the internal power-supply terminal 25. Two holding through-holes 25f serving as an internal terminal-engaging portion are formed on the holding portion 25a. Two insertion strips 25c are formed on the lower end of the internal power-supply terminal 25 by cutting out a concave portion 25b. An inclined convex portion 25g is formed on each of a pair of the insertion strips 25c by projecting the inclined convex portion 25g to the holding portion-bent side.

At both sides of an approximately intermediate portion of the internal power-supply terminal 25, a pair of terminal portions 25d is formed by bending the internal power-supply terminal 25 in a direction opposite to the holding portion-bent side. A protruded portion 25e is formed at the intermediate portion, of the internal power-supply terminal 25, opposed to a pair of the terminal portions 25d. Four brush-holding projections 26 are formed on one surface of the internal power-supply terminal 25 whose holding portion 25a is bent.

Holding of the internal power-supply terminal on the end plate 20 will be described below.

As shown in FIG. 3, a pair of the insertion strips 25c of the internal power-supply terminal 25 is inserted into the internal terminal-sandwiching slit 21b of the end plate 20. At this time, the holding through-hole 25f is penetrated into the pedestal-engaging portion 22b, the holding portion 25a contacts the upper surface 22a of the internal terminal-holding pedestal 22, the holding through-hole 25f and the pedestal-engaging portion 22b fit on each other, the bottom surface of the concave portion 25b contacts the internal terminal-supporting central concave portion 22d, and the inclined convex portion 25g fits into the stopper concave portion 22c.

Accordingly, as shown in FIGS. 1 and 4, by the fit-in of the inclined convex portion 25g in the stopper concave portion 22c, the internal power-supply terminal 25 is held by the end plate 20 such that the internal power-supply terminal 25 is incapable of moving upward. On the other hand, as shown in FIGS. 1 and 4, the bottom surface of the concave portion 25b contacts the internal terminal-supporting central concave portion 22d or the holding portion 25a contacts the upper surface 22a of the internal terminal-holding pedestal 22. Thereby, the internal power-supply terminal 25 is held by the end plate 20 such that the internal power-supply terminal 25 is incapable of moving downward. As shown FIGS. 1 and 4, the holding through-hole 25f is inserted into the pedestal-engaging portion 22b, and as shown in FIG. 3, the insertion strip 25c is inserted into the internal terminal-sandwiching slit 21b. Thereby, the internal power-supply terminal 25 is held by the end plate 20 such that the internal power-supply terminal 25 is incapable of moving in left-to-right and front-to-back directions. At this time, as shown in FIGS. 2 and 3, the terminal portion 25d of the internal power-supply terminal 25 and the protruded portion 25e are exposed from the external terminal insertion hole 21a.

Figure 8:
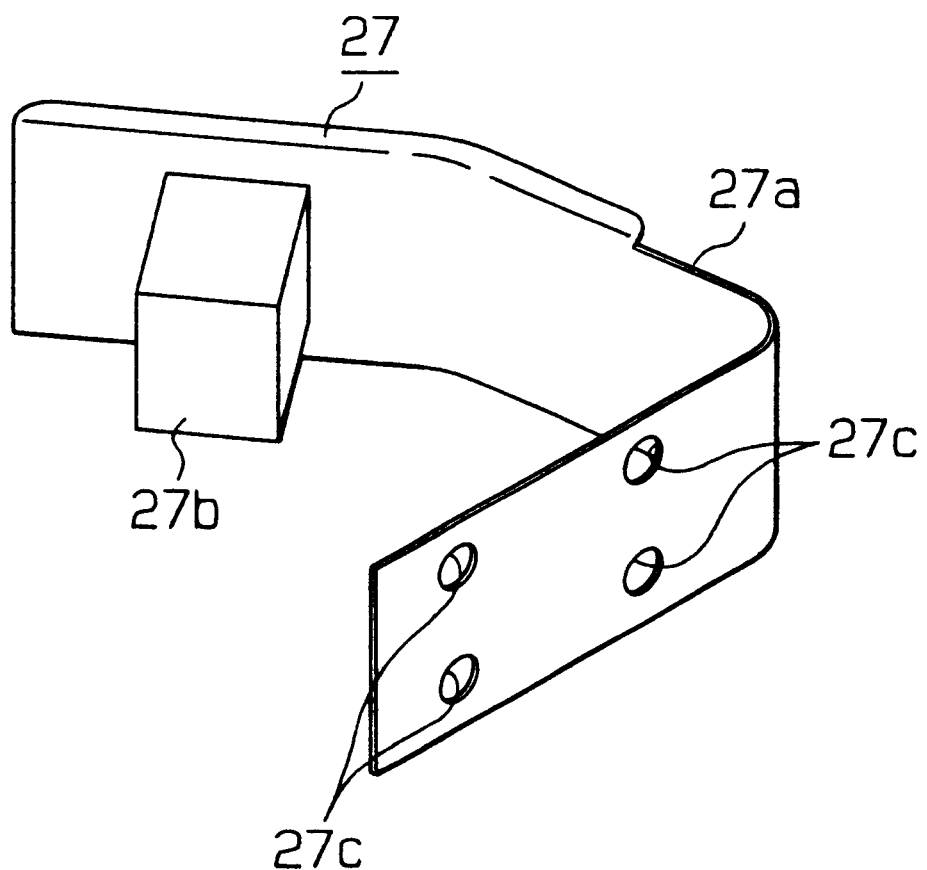
FIG. 8 is a perspective view showing a power supply brush of the power supply terminal-housing motor.

In the embodiment, the internal power-supply terminal 25 is held by the end plate 20, and a brush-holding plate 27a of a power supply brush 27 is fixedly sandwiched between the internal power-supply terminal 25 and the internal terminal-holding pedestal 22 of the end plate 20. That is, as shown in FIG. 8, four holding through-holes 27c to be connectedly fitted on the brush-holding projection 26 of the internal power-supply terminal 25 are formed at corresponding positions of the rear end of the brush-holding plate 27a. When the internal power-supply terminal 25 is held by the end plate 20, with the holding through-holes 27c of the brush-holding plate 27a connectedly fitted on the brush-holding projection 26 of the internal power-supply terminal 25, the rear end of the brush-holding plate 27a is fixedly sandwiched between the internal power-supply terminal 25 and the side surface of the internal terminal-holding pedestal 22. A brush sliding portion 27b which slidably contacts the commutator 18 is formed on the front end of the brush-holding plate 27a. When the internal power-supply terminal 25 is held by the end plate 20, the front end of the brush-holding plate 27a extends generally in parallel with the parallel portion 20a of the end plate 20.

Regarding installation of the cover member 16 having the above construction on the yoke 11, initially, as shown by two-dot chain lines of FIGS. 2 and 3, from the bottom surface of the conductive plate 19, a first separation pin 28 is inserted into the through-holes 19d and 20e from which both power supply brushes 27, located on one diagonal line, is viewable. As shown in FIG. 2, with the first separation pin 28, both power supply brushes 27 are separated from each other against a resilient force of the brush-holding plate 27a. When both power supply brushes 27 are separated from each other to positions where both power supply brushes 27 are viewable from the through-holes 19d and 20e located on the other diagonal line, as shown by the two-dot chain line of FIG. 2, both power supply brushes 27 are continuously separated from each other with a second separation pin 29.

Then, the movement prevention portion 23 is directed to the field magnet 13 with both power supply brushes 27 separated away from each other, and the cover member 16 is mounted on the yoke 11 such that the other end 14b of the rotary shaft 14 is inserted into the bearing 17 of the bearing-holding projection 24. At this time, the cover member 16 is mounted on the yoke 11 by engaging the engaging convex portion 19c with the engaging concave portion 11a of the yoke 11. When the separation pins 28 and 29 are removed from the holes 19d and 20e, the brush sliding portion 27b of each power supply brush 27 contacts the commutator 18 slidably.

When a power supply terminal T connected to an unshown external power source is inserted into the external terminal insertion hole 21a as shown in FIG. 1, the power supply terminal T is electrically connected to the internal power-supply terminal 25 sandwiched between the terminal portion 25d and the protruded portion 25e, as shown in FIGS. 2 and 3. That is, the power supply terminal T supplies an electric power to the commutator 18 through the internal power-supply terminal 25 and the power supply brush 27.

The motor 10 of the embodiment provides the following advantages.

(1) The internal power-supply terminal 25 is held by the end plate 20 by inserting a pair of the insertion strips 25c of the internal power-supply terminal 25 connected with the power supply brush 27 into the internal terminal-sandwiching slit 21b of the end plate 20, with the internal power-supply terminal 25 in contact with the internal terminal-holding pedestal 22. Further, the holding portion 25a contacts the upper surface 22a of the internal terminal-holding pedestal 22. Thereby, the internal power-supply terminal 25 is held by the end plate 20 such that the internal power-supply terminal 25 is incapable of moving vertically further. Furthermore, the holding through-hole 25f is inserted into the pedestal-engaging portion 22b, and the insertion strip 25c is inserted into the internal terminal-sandwiching slit 21b. Thereby, the internal power-supply terminal 25 is held by the end plate 20 such that the internal power-supply terminal 25 is incapable of moving in left-to-right and front-to-back directions. Consequently, the internal power-supply terminal 25 can be reliably held by the end plate 20 without the internal power-supply terminal 25 falling down.

(2) When a pair of the insertion strips 25c of the internal power-supply terminal 25 connected with the power supply brush 27 is inserted into the internal terminal-sandwiching slit 21b of the end plate 20, with the internal power-supply terminal 25 in contact with the internal terminal-holding pedestal 22, the inclined convex portion 25g fits in the stopper concave portion 22c. Thereby, the internal power-supply terminal 25 is held by the end plate 20 such that the internal power-supply terminal 25 is incapable of moving upward. Consequently, the internal power-supply terminal 25 can be reliably held by the internal terminal-holding pedestal 22 without moving the internal power-supply terminal 25 upward from the internal terminal-holding pedestal 22 and slipping off therefrom.

(3) When a pair of the insertion strips 25c of the internal power-supply terminal 25 is inserted into the internal terminal-sandwiching slit 21b of the end plate 20, with the internal power-supply terminal 25 in contact with the internal terminal-holding pedestal 22, the bottom surface of the concave portion 25b contacts the internal terminal-supporting central concave portion 22d. Thereby, the internal power-supply terminal 25 is held by the end plate 20 such that the internal power-supply terminal 25 is incapable of moving downward. Consequently, the internal power-supply terminal 25 can be more reliably held by the internal terminal-holding pedestal 22 without the internal power-supply terminal 25 falling down.

(4) The brush-holding plate 27a is formed long, and the urging pressure to be applied to the commutator 18 of the power supply brush 27 can be kept constant. Consequently, it is possible to stably operate the motor 10 for a long time and improve the life thereof.

(5) In mounting the cover member 16 on the yoke 11, the cover member 16 can be mounted on the yoke 11 by extending the brush-holding plate 27a to the position at which the power supply brush 27 and the commutator 18 do not interfere with each other, with the first and second separation pins 28 and 29 inserted into the through-holes 19d and 20e. Consequently, the cover member 16 can be easily mounted on the yoke 11. Thus, it is possible to improve the productivity of the motor 10.

(6) owing to the shielding operation of the conductive plate 19, it is possible to prevent electrical noise generated when the power supply brush 27 and the commutator 18 slidably contact each other from leaking outside from the opening of the yoke 11.

(7) Because the brush-holding plate 27a of the power supply brush 27 is directly connected to the rear surface of the internal power-supply terminal 25, there is no gap generated between a flat plate portion to be connected to the brush-holding plate and a female terminal. Thus, it is possible to miniaturize the motor 10. Because the internal power-supply terminal 25 is also miniaturized, it is possible to reduce the material cost.

(8) The brush-holding plate 27a is sandwiched between the internal power-supply terminal 25 and the internal terminal-holding pedestal 22, and the brush-holding projection 26 of the internal power-supply terminal 25 fits in the holding through-hole 27c of the brush-holding plate 27a. Therefore, the brush-holding plate 27a can be mounted easily on the brush-holding projection 26 without using extra component parts. Further, it is possible to fix the brush-holding plate 27a to the brush-holding projection 26 reliably and unmovably owing the engagement between the holding through-hole 27c and the brush-holding projection 26.

The embodiment is not limited to the above construction, but may be altered as follows.

The internal terminal-holding pedestal 22 may be shaped differently from FIGS. 2 and 4. Further, the number of the pedestal-engaging portion 22b may be one or three or more.

The internal power-supply terminal 25 may be shaped differently from FIGS. 5–7. For example, the formation of the inclined convex portion 25g may be omitted. In this case, the formation of the stopper concave portion 22c engaged by the inclined convex portion 25g may be also omitted.

The power supply brush 27 may be shaped differently from FIG. 8. For example, the number, position, and configuration of the holding through-hole 27c may be altered. In this case, the brush-holding projection 26 formed on the internal power-supply terminal 25 is altered in correspondence with the holding through-hole 27c.

The brush-holding plate 27a may be fixed differently. For example, the means for unmovably connecting the brush-holding plate 27a may be provided on at least one of the brush-holding plate 27a, the internal power-supply terminal 25, and internal terminal-holding pedestal 22. Further, instead of sandwiching the brush-holding plate 27a between the internal power-supply terminal 25 and the internal terminal-holding pedestal 22, but the brush-holding plate 27a may be fixed to the internal power-supply terminal 25 with other fixing means.

The conductive plate 19 may be fixed to the end plate 20 with other fixing means such that the conductive plate 18 covers the rear surface 20c of the end plate 20, after the end plate 20 is formed by molding the material.

One engaging convex portion 19c or three or more engaging convex portions 19c may be formed on each circular-arc portion 19b.

The motor 10 may be a multi-pole motor having three or more field magnets 13 formed thereon.

The number of the movement prevention portion 23 may be changed. Two or more movement prevention portions 23 may be provided for each field magnet 13.

The plane sectional configuration of the motor 10 may be a circular configuration.

What is claimed is:

1. A power supply terminal-housing motor comprising:
   a yoke accommodating an armature having a rotary shaft on which a commutator is mounted;
   a plate mounted on an opening of the yoke and having a pair of internal terminal-holding pedestals projected from an inner side surface thereof such that the internal terminal-holding pedestals sandwich the rotary shaft therebetween, and an external terminal insertion hole provided in the vicinity of the internal terminal-holding pedestals;
   a pair of leaf spring-like brush-holding plates resiliently urging and supporting a brush to allow the brush to contact the commutator; and
   a pair of internal power-supply terminals, each having a terminal portion to be connected to a power supply terminal inserted from the external terminal insertion hole to supply power from outside and a connection portion to be connected to the brush-holding plates, wherein each of the pair of internal power-supply terminals is held by each of the internal terminal-holding pedestals, respectively,
   wherein the brush-holding plate is sandwiched between the internal power-supply terminal and the internal terminal-holding pedestal, and at least one of the internal power-supply terminal or the internal terminal-holding pedestal has connection means for connecting the brush-holding plate thereto so that the brush-holding plate is unmovable.

2. A power supply terminal-housing motor as in claim 1, wherein:
   the internal power-supply terminal has the terminal portion on one side surface thereof and the connection portion oh the other side surface thereof.

3. A power supply terminal-housing motor comprising:
   a yoke accommodating an armature having a rotary shaft on which a commutator is mounted;
   a plate mounted on an opening of the yoke and having a pair of internal terminal-holding pedestals projected from an inner side surface thereof such that the internal terminal-holding pedestals sandwich the rotary shaft therebetween, and an external terminal insertion hole provided in the vicinity of the internal terminal-holding pedestals;
   a pair of leaf spring-like brush-holding plates resiliently urging and supporting a brush to allow the brush to contact the commutator; and
   a pair of internal power-supply terminals each having a terminal portion to be connected to a power supply terminal inserted from the external terminal insertion hole to supply power from outside and a connection portion to be connected to the brush-holding plates, wherein each of the pair of internal power-supply terminals is held by each of the internal terminal-holding pedestals, respectively,
   wherein the plate has a pedestal-engaging portion formed on an upper surface of the internal terminal-holding pedestal and an internal terminal-sandwiching slit provided in the vicinity of the internal terminal-holding pedestal, and
   wherein the internal power-supply terminal has at one end thereof a holding portion having an internal terminal-engaging portion engaging the pedestal-engaging portion, and at the other end thereof a pair of insertion strips to be engagedly fitted into the internal terminal-sandwiching slit.

4. A power supply terminal-housing motor as in claim 3, wherein:
   the plate has a stopper concave portion formed continuously with the internal terminal-sandwiching slit; and
   each of a pair of the insertion strips has an inclined convex portion engaging the stopper concave portion.

5. A power supply terminal-housing motor as in claim 3, wherein:
   an internal terminal-supporting central concave portion fitting in a concave portion between a pair of the insertion strips is formed on the internal terminal-sandwiching slit.

6. A power supply terminal-housing motor comprising:
   a yoke accommodating an armature having a rotary shaft on which a commutator is mounted;
   a plate mounted on an opening of the yoke and having a pair of internal terminal-holding pedestals projected from an inner side surface thereof such that the internal terminal-holding pedestals sandwich the rotary shaft therebetween, and an external terminal insertion hole provided in the vicinity of the internal terminal-holding pedestals;
   a pair of leaf spring-like brush-holding plates resiliently urging and supporting a brush to allow the brush to contact the commutator; and
   a pair of internal power-supply terminals each having a terminal portion to be connected to a power supply terminal inserted from the external terminal insertion hole to supply power from outside and a connection portion to be connected to the brush-holding plates, wherein each of the pair of internal power-supply terminals is held by each of the internal terminal-holding pedestals, respectively,
   wherein the plate has a pair of parallel portions and a pair of circular-arc portions formed thereon, and the brush-holding plate is formed substantially parallel with the parallel portions.

7. A power supply terminal-housing motor as in claim 6, wherein:
   the plate has a through-hole at a position corresponding to a position of the brush-holding plate.

8. A power supply terminal-housing motor comprising:
   a yoke accommodating an armature having a rotary shaft on which a commutator is mounted;
   a plate mounted on an opening of the yoke and having a pair of internal terminal-holding pedestals projected from an inner side surface thereof such that the internal terminal-holding pedestals sandwich the rotary shaft therebetween, and an external terminal insertion hole provided in the vicinity of the internal terminal-holding pedestals;

a pair of leaf spring-like brush-holding plates resiliently urging and supporting a brush to allow the brush to contact the commutator; and a pair of internal power-supply terminals each having a terminal portion to be connected to a power supply terminal inserted from the external terminal insertion hole to supply power from outside and a connection portion to be connected to the brush-holding plates, wherein each of the pair of internal power-supply terminals is held by each of the internal terminal-holding pedestals, respectively, wherein the plate has a conductive plate formed integrally therewith such that an outer side surface of the plate is covered with the conductive plate.

9. A power supply terminal-housing motor comprising:

an armature having a commutator;

a plate having a pair of internal terminal-holding pedestals projected from an inner side surface of the motor such that the internal terminal-holding pedestals sandwich the commutator in a radial direction therebetween;

a pair of leaf spring-like brush-holding plates resiliently urging and supporting a brush to allow the brush to contact the commutator; and a pair of internal power-supply terminals having a terminal portion to be connected to a power supply terminal inserted into the motor to supply a power source from outside and a connection portion to be connected to the brush-holding plates, wherein the brush-holding plates and the connection portion are held by the internal terminal-holding pedestals such that the brush-holding plates and the connection portion are disposed one above the other, wherein the plate has a pedestal-engaging portion formed on an upper surface of the internal terminal-holding pedestal and an internal terminal-sandwiching slit provided in the vicinity of the internal terminal-holding pedestal; and the internal power-supply terminal has at one end thereof a holding portion having an internal terminal-engaging portion engaging the pedestal-engaging portion, and at the other end thereof a pair of insertion strips to be engagedly fitted into the internal terminal-sandwiching slit.

10. A power supply terminal-housing motor as in claim 9, wherein:

the plate has a stopper concave portion formed continuously with the internal terminal-sandwiching slit; and each of a pair of the insertion strips has an inclined convex portion engaging the stopper concave portion.

11. A power supply terminal-housing motor as in claim 9, wherein:

an internal terminal-supporting central concave portion fitting in a concave portion between a pair of the insertion strips is formed on the internal terminal-sandwiching slit.

12. A power supply terminal-housing motor as in claim 9, wherein: the plate has a pair of parallel portions and a pair of circular-arc portions formed thereon; and the brush-holding plate is formed substantially parallel with the parallel portions.

13. A power supply terminal-housing motor as in claim 12, wherein:

the plate has a through-hole at a position corresponding to a position of the brush-holding plate.

14. A power supply terminal-housing motor as in claim 9, wherein the connection portion is formed on a rear surface of the terminal portion.

15. A power supply terminal-housing motor comprising:

an armature having a commutator;

a plate having a pair of internal terminal-holding pedestals projected from an inner side surface of the motor such that the internal terminal-holding pedestals sandwich the commutator in a radial direction therebetween;

a pair of leaf spring-like brush-holding plates resiliently urging and supporting a brush to allow the brush to contact the commutator; and a pair of internal power-supply terminals having a terminal portion to be connected to a power supply terminal inserted into the motor to supply a power source from outside and a connection portion to be connected to the brush-holding plates, wherein the brush-holding plates and the connection portion are held by the internal terminal-holding pedestals such that the brush-holding plates and the connection portion are disposed one above the other, wherein the plate has a conductive plate formed integrally therewith such that an outer side surface of the plate is covered with the conductive plate.

16. A power supply terminal-housing motor as in claim 15, wherein the conductive plate substantially limits leakage of electrical noise generated by the brush and the commutator.

* * * * *